Sept. 6, 1966  A. B. STILES  3,271,322
CATALYTIC SURFACE
Filed June 30, 1964
FIG. 1
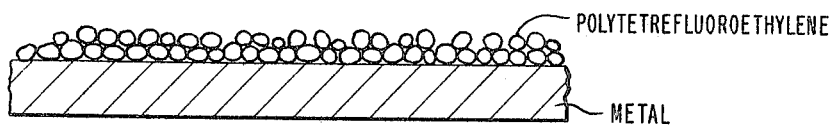
↓ HEAT
FIG. 2
↓ ADD γ ALUMINA
FIG. 3
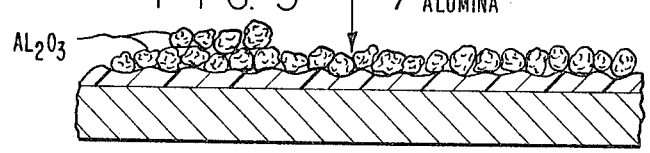
↓ HEAT
FIG. 4
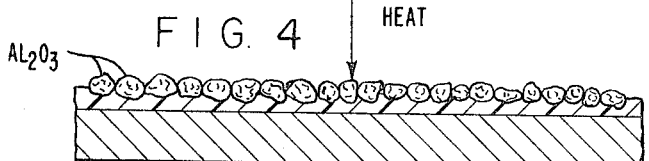
↓ ADD CERIUM NITRATE, CALCINE
ADD PLATINIC CHLORIDE
AND RUTHENIUM CHLORIDE
AND CALCINE
FIG. 5
$Al_2O_3$ COATED WITH $CeO_2$, Pt, AND Ru
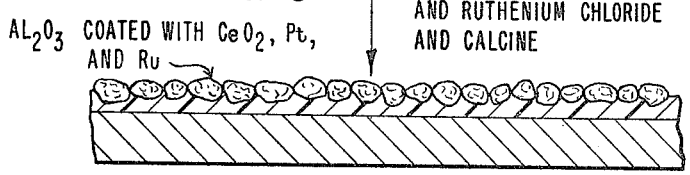
INVENTOR
ALVIN B. STILES
BY
ATTORNEY 3,271,322
CATALYTIC SURFACE
Alvin B. Stiles, Welshire, Wilmington, Del., assignor to E. I. du Pont de Nemours and Company, Wilmington, Del., a corporation of Delaware
Filed June 30, 1964, Ser. No. 379,161
4 Claims. (Cl. 252—428)

This invention relates to catalysts and is more particularly directed to catalysts which are supported upon a particulate carrier which in turn is anchored to a coating of polytetrafluoroethylene which in turn is adherently supported by a non-catalytic surface. The invention is further directed to the preparation of such articles. The invention is particularly applicable to the forming of catalytic surfaces in the interior of cooking devices such as ovens, broilers, roasters and the like.

The difficulties experienced in cleaning cooking devices has recently led to the development of a self-cleaning oven. This operates by heating the oven to burn out food residues. This is not as satisfactory as could be desired because of the high temperatures required to effect the cleaning, say 800 to 900° F.

The catalytic coatings of the present invention are particularly applicable to the coating of the surfaces of cooking devices and can be used wherever it is desired securely to affix the catalyst to a surface.

The invention can be better understood by reference to the drawings in which:

FIGURE 1 is an artists' illustration, not strictly to scale, which shows, partly in cross-section, a surface coated with a polytetrafluoroethylene emulsion according to one preferred process of the invention, and FIGURES 2, 3, 4, and 5 show the subsequent steps of heating to coalesce the polymer, the addition of a catalyst carrier, its impregnation with salts of catalytic metals and the conversion of such salts to catalytic forms to produce in FIGURE 5 a preferred product of the invention.

The present invention can be used to coat any of a wide variety of surfaces as will be described hereinafter and can be used for coating heat exchanger tubes, reactor walls and grids and similar surfaces of high area in reactors.

The present invention however is preferably used for the production of surfaces of cooking devices. The comparatively high cost of the polytetrafluoroethylene is justified in cooking devices because of the pleasing appearance of the resulting coating in addition to its valuable inertness and surface properties.

Coatings according to the invention can be applied to ovens and grills used industrially or for household purposes. In each instance the surface of such devices and appliances which are spattered by grease or receive drippings of grease or food particles can be coated with a catalyst according to the invention. In the same way the trays and grills or broilers as well as their side walls can be treated. Trays and reflectors below burners and cooking appliances can similarly be treated. The shelves and grids of cooking devices can also be treated with catalysts according to the invention.

It will be understood that the invention is very broadly applicable to those surfaces of cooking devices which are subject to receiving splattered grease and other food products of cooking and will include brick ovens, ceramic ovens and of course the customary metal ovens in household use. They can extend similarly to cooking devices in which heating elements are embedded in ceramic walls or trays. The invention of course can be applied to such devices as rotisseries, chafing dishes, grills and broilers of all sorts.

The surfaces to be coated according to the invention can be of any solid material ordinarily used in construction of devices of the character to be treated. Ordinarily such surfaces are not catalytic or if there is any catalytic activity it is of such a low order as to justify covering it with a more active catalyst.

Typically the surfaces to be coated can be aluminum or copper or iron and steel alloys including stainless steels. These metals can be galvanized or electroplated with zinc, copper, chromium, or other metals, or they can be clad with aluminum, copper or another metal. Aluminum can be anodized in customary manner.

The surfaces can of course be coated with ceramics such as the usual ceramic enamels which are employed in ovens, broilers and the like.

The various surfaces can be treated to roughen them and to increase adherence of the polytetrafluoroethylene as will be illustrated in the examples. Generally it can be said that the metals can be etched with a suitable acid or with a suitable fused salt. The ceramic enamels can similarly be etched with acids or with fused alkalis. Alternatively, the surfaces can be mechanically roughened.

According to the invention an aqueous emulsion of polytetrafluoroethylene is applied to a surface of the types described. This is illustrated in FIGURE 1 of the drawing. The polytetrafluoroethylene emulsion can be any of those known in the art and typical of such emulsions are described in the following U.S. patents:

Hochberg 2,681,324, issued June 15, 1954
Hochberg 2,710,266, issued June 7, 1955
Emig et al. 2,668,157, issued February 2, 1954
Kumnick et al. 2,891,921, issued June 23, 1959
Berry 2,937,156, issued May 17, 1960
Evans et al. 2,945,831, issued July 19, 1960.

The polytetrafluoroethylene emulsion can also be modified by the inclusion of various materials such as polyhexafluoropropylene. Small amounts of plasticizers, pigmenting agents and the like can of course be included. The polytetrafluoroethylene emulsion does not constitute any part of the present invention and the prior art is replete with the technology for the preparation and application of these emulsions.

The amount of polytetrafluoroethylene polymer should be sufficient to give a continuous coating on the surface being treated though it is not imperative that it be absolutely continuous. More material can be used to make a coating of some thickness, say up to about 10 mils. Greater thicknesses are of course possible but the coating becomes unduly expensive with no corresponding advantage and the mechanical adherence tends to become poorer with very thick coatings.

The polytetrafluoroethylene emulsion is heated to drive off water and the heating is continued to the softening point of the polymer to effect at least a partial coalescence of the polymer particles. This is illustrated in FIGURE 2 of the drawings. The temperature of heating can readily be determined by experiment and is usually known in advance with respect to a particular emulsion. Ordinarily the temperatures will be about 300° C. but may run up for brief periods to 400° C. or to the point of incipient decomposition of the polymer.

The next step in the preparation of products of the invention is illustrated in FIGURE 3 of the drawings wherein there is shown a particulate carrier applied as a coating to the polytetrafluoroethylene. Ordinarily the polymer coating is allowed to cool and solidify before the coating of carrier is added though it can be added, particularly in a continuous process, while the coating is still at a comparatively high temperature.

The particulate carriers can be any of the carrier materials already well-known to the prior art as catalyst carriers. Generally it is preferred to use finely divided particulate alumina, ceria, silica-alumina, magnesia, calcium oxide, silica zirconia, titania, calcium sulfate, barium oxide, chromia, manganese oxide, and chromites and manganites of such metals as those of nickel, copper, cobalt and manganese.

The carrier should be in the form of particles and it is preferred that they be moderately small, say such that they will pass a U.S. standard 100-mesh screen. The surface area should exceed 5 square meters per gram and can be quite high, running up to 600 or 800 square meters per gram or even higher.

The amount of the finely divided carrier should be approximately sufficient to form a monolayer on the polymer though less is effective in proportion to the amount present. In some instances it may be desirable to have only about half enough carrier to effect continuous coating. There is no advantage in having much more than a continuous coating though excesses can be brushed off after the heating step and do no particular damage. As a matter of fact, as will be shown in the examples, it is often preferred to use some excess and then to dust off the excess after the material in contact with the polymer has become embedded therein and has become anchored.

One of the preferred carriers is alumina and gamma alumina, commonly called activated alumina, is especially desired. Of course any of the so-called activated aluminas can be used including one or a plurality of the forms gamma, eta, chi, and kappa.

A particularly desirable form of alumina is that shown in Bugosh Patent 2,915,475. This is alumina monohydrate having the boehmite crystal lattice and being in the form of fibrils. Upon heating in the course of a process of the present invention the alumina monohydrate is converted to gamma alumina. This is illustrated in the examples.

The polymer dusted with the carrier as illustrated in FIGURE 3 is then heated as in the step above, again to soften the polymer. As noted above the temperature can be maintained throughout, especially if the operation is continuous, but as shown in the figures the polymer is allowed to cool between the heating steps.

As a result of the heating step the particles are partially embedded as shown in FIGURE 4 and are thus firmly anchored to the polymer.

The carrier embedded in the polymer is then treated with a catalyst as shown in the drawing. The catalytic materials can most broadly be any catalyst. More particularly any of the well-known catalysts for oxidation can be used for treatment of the surfaces of cooking devices. There can be used the catalytically active compounds of copper, tin, vanadium, niobium, bismuth, chromium, molybdenum, tungsten, manganese, rhenium, iron, cobalt, nickel, and cerium. Compounds of the precious metals or the metals themselves can be used in accordance with known practices. The precious metals particularly suitable are ruthenium, rhodium, palladium, and platinum. As is customary, the various catalytic metals will be used as their oxides, cerates, manganates or manganites, chromates or chromites, or their vanadates.

Especially preferred catalysts because of their comparatively high activity at low temperatures are ruthenium, palladium, and platinum metals and the oxides, cerates, manganates or manganites, chromates or chromites or vanadates of cobalt, nickel, cerium, ruthenium, palladium and platinum.

The catalysts are ordinarily most readily formed in situ by the addition, as illustrated in the drawing, of appropriate salts which upon heating form the desired catalyst. This will be illustrated in the examples.

Alternatively the catalyst can be preformed by treating an appropriate particulate carrier with the catalytic material and heat treating if necessary so that the material added in FIGURE 3 is not only the carrier but the carrier plus the desired catalyst. The heating step would then anchor the catalyst in place and would form the final product.

In processes as illustrated in the drawing the heating steps between FIGURES 4 and 5 converts the salts of the catalytic materials to the desired catalysts. In the drawing this is shown as a conversion of cerium nitrate to ceria and the carrier is thereafter treated with an aqueous solution of platinic chloride and ruthenium chloride which after drying is calcined to form platinum and ruthenium metals. The schemes of FIGURES 1 through 5 of the drawing are illustrated in detail in Example 1 including minor process conditions not specifically illustrated.

The use of films of the invention for support of oxidizing or reducing catalysts is believed evident. The films can be formed in place upon appropriate surfaces of reactors, etc., as described above. Alternatively a film can be supported upon a material upon which there is no adherence or which is coated with a parting compound and the film can be stripped and used as such, for example, on the floor of a broiler or oven.

The mode of use of cooking devices, the surfaces of which have been coated or which carry such films as are described, is similar to the present practice with self-cleaning ovens. After there is a certain accumulation of drippings and splatterings of food products in cooking devices, the walls of which are coated with a catalyst according to the invention, these accumulations are removed by heating the cooking devices to a temperature of 350° F. or preferably from 400 to 500° F. or somewhat above. There is of course air present in such cooking devices and there is a catalytic reaction which will convert the food products to carbon dioxide and water.

The catalyst and support may be incompletely revived catalytically and incompletely reverted to its original color so that the oven becomes discolored. To avoid this condition and to cure it a solution of a strong oxidizing agent such as hydrogen peroxide can be applied in solution to the surfaces of the cooking device and surfaces thereafter can be heated to return them to their original color and condition.

In order that the invention may be better understood reference should be had to the following illustrative examples.

*Example 1*

(1) A sheet of mild steel 6″ x 6″ x 1/32″ thick is coated by painting with an emulsion of tetrafluoroethylene resin. The emulsion is dried by placing in an oven at 110° C., and the retained polytetrafluoroethylene granules (FIGURE 1) are sintered to form a continuous surface (FIGURE 2) by calcining at 300° C. for 1 hour.

(2) The coated sheet metal is coated with an aqueous slurry containing a weight of aluminum oxide equal to 10% of the weight of water. This coating (FIGURE 3) is dried at 110° C. and also is sintered by calcination at 300° C. for 1 hour to produce the coating shown in FIGURE 4. The aluminum oxide used in the suspension is that described in U.S. Patent 3,117,944, Example 1.

(3) After calcining, the porous aluminum oxide granules embedded in the surface, but exposed to the atmosphere by partial extension above the polytetrafluoroethylene surface, are impregnated with a 10% aqueous solution of cerium nitrate. This is dried at 110° C., then is calcined at 300° C. to remove the nitrate ion.

(4) The calcined and impregnated sheet is then immersed in a solution of platinic and ruthenium chlorides containing 1 gram of metallic platinum and 0.1 gram of ruthenium as metals per liter of solution. The sheets are subsequently calcined in air at 300° C. for 30 minutes. Thereafter, the sheets are immersed in a 10% solution of formaldehyde and finally are calcined at 200° C. for 15 minutes. This composite structure is shown in FIGURE 5.

The sheets so produced are effective as oven walls for self-cleaning when smeared with typical materials which are splashed, spattered, or dropped into ovens used for domestic cooking. Complete oxidation of peanut oil, hydrogenated coconut oil, sugar (sucrose), dextrose, blackstrap molasses, protein such as fragments of meat or egg albumin, or sugary syrups such as strawberry and cherry juice are all effectively oxidized when such sheet, after having been smeared with one or all of these ingredients, is heated to 300 to 375° C. for a period of 3 hours or more in air.

Example 2

(1) A stainless steel sheet 6" x 6" x 1/32" thick having the composition of AISI type 304 is coated by painting with an emulsion of tetrafluoroethylene resin. The emulsion is dried by placing in an oven at 110° C., and the retained polytetrafluoroethylene granules are sintered to form a continuous surface by calcining at 300° C. for 1 hour.

(2) This instruction is the same as Instruction 2 of Example 1 except that a slurry containing 10% by weight of eta-alumina having a mesh size smaller than 325 mesh is used instead of the fibrous alumina.

(3) The sheet coated with polytetrafluoroethylene with embedded, but partially exposed eta-alumina, is next impregnated by immersing in an ammoniacal solution of cobalt and nickel carbonates comprising the equivalent of 15 grams of metallic nickel and 15 grams of metallic cobalt per liter of solution. This is finally calcined by heat treatment at 300° C. in an air atmosphere for 1 hour. This catalyst is useful in the same applications as those described for the sheet prepared in Example 1.

The sheet can be further treated by immersion in a solution of platinum and palladium chlorides containing one-half a gram of metallic platinum and one-half gram of metallic palladium per liter of solution to produce an active catalyst after reduction with formaldehyde as described in Example 1, Instruction 4.

Example 3

(1) The same as Instruction 1 of Example 1 with the exception that a 6" x 6" x 1/16" aluminum sheet is used instead of the mild steel.

(2) The same as Instruction 3 of Example 1 with the exception that a 10% aqueous slurry of cerium oxide passing 325 mesh screen is used instead of the fibrous boehmite-type aluminum oxide.

(3) The sheet is now immersed in a solution containing 15 grams of metallic nickel as the basic ammoniacal nitrate solution of nickel carbonate. The sheet is dried, then calcined to convert the nickel carbonate to nickel oxide. This is useful in processes and oxidation operations as defined for Example 1.

The catalyst of Instruction 3 is further treated by impregnation with ruthenium as a solution containing 0.5 g. Ru/liter, utilizing the procedure of Instruction 4 of Example 1 to obtain a catalyst as effective or more effective than that with the nickel alone. Effective catalysts are prepared when a like weight of rhodium or palladium or platinum is substituted for the ruthenium.

Example 4

This is the same as Example 3 with the exception that a 10% aqueous slurry of minus 325 mesh nickel chromite, instead of the aluminum oxide, is impregnated onto the coating together with the polytetrafluoroethylene emulsion in Instruction 2.

Example 5

Same as Example 4 except a 10% aqueous slurry of nickel cerate is used instead of nickel chromite in Instruction 2.

Example 6

The same as Example 4 except that in Instruction 2 a 10% aqueous slurry of copper cerate is substituted for the nickel chromite.

Example 7

This is the same as Example 1 with the exception that a 10% aqueous slurry of silica-alumina having a surface area exceeding 400 m.$^2$/g. and a sodium content less than 0.1% is used in Instruction 2 instead of the aluminum oxide.

Example 8

This is the same as Example 4 with with the exception that a 10% aqueous slurry of manganese dioxide having a surface area in excess of 25 m.$^2$/g. is used in Instruction 2 instead of the nickel chromite.

Example 9

This is the same as Example 1 with the exception that in Instruction 3 a 10% aqueous solution of bismuth nitrate is used instead of the cerium nitrate.

Example 10

This is the same as Example 9 except that a 10% aqueous solution of chromium nitrate is used instead of the bismuth nitrate.

Example 11

This is the same as Example 10 with the exception that a 10% aqueous solution of ammonium molybdate is used instead of the chromium nitrate.

Example 12

The same as Example 11 except that a 10% aqueous slurry of ammonium tungstate is used instead of the ammonium molybdate.

Example 13

The same as Example 12 except that a 10% aqueous solution of ammonium perrhenate is used instead of the ammonium tungstate.

Example 14

The instructions are the same as for Example 7 except that a 10% aqueous slurry of silica-magnesia is substituted for the silica-alumina.

Example 15

The instructions are the same as for Example 14 with the exception that a 10% aqueous slurry of finely divided, high surface area magnesia is used instead of the silica-magnesia.

Example 16

This is the same as Example 15 except that a 10% aqueous slurry of calcium oxide is substituted for the magnesia.

Example 17

The same instructions are allowed as for Example 16 except a 10% aqueous slurry of zirconia is substituted for the calcium oxide.

Example 18

This is the same as Example 17 except that a 10% aqueous slurry of titania is substituted for the zirconia.

Example 19

The same instructions are to be used as for Example 18 except that a 10% aqueous slurry of barium oxide is used instead of the titania.

Example 20

This procedure is the same as for Example 19 except that a 10% aqueous slurry of calcium sulfate is substituted for the barium oxide.

I claim:
1. A catalytic surface which consists essentially of a film of polytetrafluoroethylene, particulate carrier, and a catalyst, the catalyst being supported upon the said carrier and the supported catalyst being carried upon a surface and partially embedded in said film.
2. The combination of claim 1 together with a non-catalytic supporting means upon which said polytetrafluoroethylene film is supported.
3. The combination of claim 2 in which the catalyst is selected from the group consisting of ruthenium, palladium, platinum, or oxides, cerates, manganates, manganites, chromates, chromites, or vanadates of cobalt, nickel, cerium, ruthenium, palladium, and platinum and in which the particulate carrier is selected from the group consisting of alumina, ceria, silica-alumina, magnesia, calcium oxide, silica, zirconia, titania, calcium sulfate, barium oxide, chromia, manganese oxide, chromites, and manganites.
4. In a process for making an article of claim 2 the steps comprising applying an aqueous emulsion of polytetrafluoroethylene to a surface, heating to drive off water and to cause the polytetrafluoroethylene particles to coalesce, coating the resulting polytetrafluoroethylene film with a particulate carrier, heating again to at least the softening point of the polytetrafluoroethylene whereby to anchor the carrier, and applying a catalyst to the carrier.

References Cited by the Examiner

UNITED STATES PATENTS

| | | | |
|---|---|---|---|
| 1,683,375 | 9/1928 | Wiederhold | 126—92 |
| 2,433,932 | 1/1948 | Stosick | 252—471 X |
| 2,543,708 | 2/1951 | Rice et al. | 158—96 X |
| 3,121,158 | 2/1964 | Hurko | 126—273 X |
| 3,145,289 | 8/1964 | Swetlitz | 126—39 |

FREDERICK L. MATTESON, JR., *Primary Examiner.*

E. G. FAVORS, *Assistant Examiner.*